(12) United States Patent
Chun et al.

(10) Patent No.: US 11,623,471 B2
(45) Date of Patent: Apr. 11, 2023

(54) OMNIDIRECTIONAL WHEEL AND THREE-WHEELED VEHICLE USING THE SAME

(71) Applicants: Hyundai Motor Company, Seoul (KR); Kia Motors Corporation, Seoul (KR)

(72) Inventors: Joo Young Chun, Seoul (KR); Eun Ho Seo, Gyeonggi-do (KR); Hun Keon Ko, Gyeonggi-do (KR); Jun Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 272 days.

(21) Appl. No.: 17/070,048

(22) Filed: Oct. 14, 2020

(65) Prior Publication Data
US 2021/0114404 A1 Apr. 22, 2021

(30) Foreign Application Priority Data
Oct. 16, 2019 (KR) .................. 10-2019-0128679

(51) Int. Cl.
*B60B 19/00* (2006.01)
*B62K 5/027* (2013.01)
(Continued)

(52) U.S. Cl.
CPC .............. *B60B 19/003* (2013.01); *B60C 3/02* (2013.01); *B60C 7/20* (2013.01); *B62K 5/027* (2013.01); *B62K 5/05* (2013.01); *F16H 7/02* (2013.01)

(58) Field of Classification Search
CPC ........... B60B 19/003; B60C 7/20; B60C 3/02; B62K 5/027; B62K 5/05; F16H 7/02
See application file for complete search history.

(56) References Cited

U.S. PATENT DOCUMENTS 8,240,407 B2 8/2012 Takenaka et al.
8,583,302 B2 * 11/2013 Akimoto ................ B62K 11/06
180/21

(Continued)

FOREIGN PATENT DOCUMENTS

CZ      288916 B6 *  9/2001
KR   101002990 B1 *  8/2010

OTHER PUBLICATIONS

Feldspar, No Puncture Tire English Translation, 2010 (Year: 2010).*
(Continued)

*Primary Examiner* — James A English
*Assistant Examiner* — Matthew James O'Neill
(74) *Attorney, Agent, or Firm* — Fox Rothschild LLP (57) ABSTRACT

An omnidirectional wheel and a three-wheeled vehicle using the same are provided. The omnidirectional wheel includes a tire that is formed in the shape of an open torus having an open portion and a main rotation unit that is connected to the tire to rotate the tire about a main rotation axis passing through the center of an inner opening formed in a circular hole shape by the tire. A circumferential rotation unit connects opposite ends of the tire that form the open portion therebetween and rotates the tire about a circumferential axis formed in a circumferential direction of the tire to move the tire in a direction parallel to the main rotation axis.

14 Claims, 4 Drawing Sheets

(51) Int. Cl.
  *B60C 7/20*  (2006.01)
  *F16H 7/02*  (2006.01)
  *B60C 3/02*  (2006.01)
  *B62K 5/05*  (2013.01)

(56) References Cited

U.S. PATENT DOCUMENTS

| | | | |
|---|---|---|---|
| 9,770,943 B2 * | 9/2017 | Liddiard | ............ B60C 3/02 |
| 9,864,396 B1 * | 1/2018 | Brown | ............ B62D 15/00 |
| 9,919,557 B2 | 3/2018 | Yoshino et al. | |

OTHER PUBLICATIONS

Osmera, Omnidirectional Vehicle with Drive Control without Angular Displacement of Wheels English Translation (Year: 1996).*

* cited by examiner

FIG. 4 in# OMNIDIRECTIONAL WHEEL AND THREE-WHEELED VEHICLE USING THE SAME

CROSS-REFERENCE TO RELATED APPLICATION

This application claims the priority benefit of Korean Patent Application No. 10-2019-0128679, filed on Oct. 16, 2019, the disclosure of which is incorporated herein by reference.

BACKGROUND

1. Field of the Disclosure

The present disclosure relates to an omnidirectional wheel and a three-wheeled vehicle using the same, and more particularly, to an omnidirectional wheel that reduces the turning radius of a vehicle and a three-wheeled vehicle using the same.

2. Description of the Related Art

For a small-sized vehicle, since the vehicle may be used on a sidewalk, rather than a road, the vehicle needs to be capable of changing the moving direction thereof more freely than general vehicles. To facilitate a change in the moving direction of a small-sized vehicle, the turning radius with which the small-sized vehicle turns should be minimized. However, when typical wheels that are generally used for vehicles are applied to a small-sized vehicle, there is a limitation on the extent to which the turning radius of the small-sized vehicle may be reduced due to the length of the vehicle body thereof.

SUMMARY

Therefore, the present disclosure provides an omnidirectional wheel for reducing the turning radius of a vehicle and a three-wheeled vehicle using the same.

In accordance with an aspect of the present disclosure, the above and other objects may be accomplished by the provision of an omnidirectional wheel that may include a tire formed in the shape of an open torus having an open portion, a main rotation unit connected to the tire to rotate the tire about a main rotation axis passing through the center of an inner opening formed in a circular hole shape by the tire, and a circumferential rotation unit configured to connect opposite ends of the tire that form the open portion therebetween and to rotate the tire about a circumferential axis formed in a circumferential direction of the tire such that the tire moves in a direction parallel to the main rotation axis.

In accordance with another aspect of the present disclosure, a three-wheeled vehicle including a vehicle body, an omnidirectional wheel connected to the vehicle body to move the vehicle body in a main travel direction or in a sub-travel direction perpendicular to the main travel direction, and two front wheels connected to the vehicle body and configured to change the main travel direction in which the vehicle body moves through rotation thereof about an axis parallel to a vertical direction and to move the vehicle body in the new main travel direction through rotation thereof about a main rotation axis parallel to a sub-travel direction changed along with a change in the main travel direction. Additionally, the omnidirectional wheel may include a tire formed in an open torus shape, a main rotation unit config- ured to rotate the tire about the main rotation axis, and a circumferential rotation unit configured to rotate the tire about a circumferential axis formed in the circumferential direction of the tire to move the tire in the sub-travel direction.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. In the drawings, the same or similar elements are denoted by the same reference numerals even though they are depicted in different drawings. In the following description of the present disclosure, a detailed description of known functions and configurations incorporated herein will be omitted when it may make the subject matter of the present disclosure rather unclear.

Additionally, terms such as "first", "second", "A", "B", "(a)", "(b)", etc. may be used herein to describe the components of the exemplary embodiments of the present disclosure. These terms are only used to distinguish one element from another element, and the essence, order, or sequence of corresponding elements is not limited by these terms. It should be noted that if it is described in the specification that one component is "connected", "coupled", or "joined" to another component, the former may be directly "connected", "coupled", or "joined" to the latter, or may be "connected", "coupled", or "joined" to the latter via another component.

Figure 1:
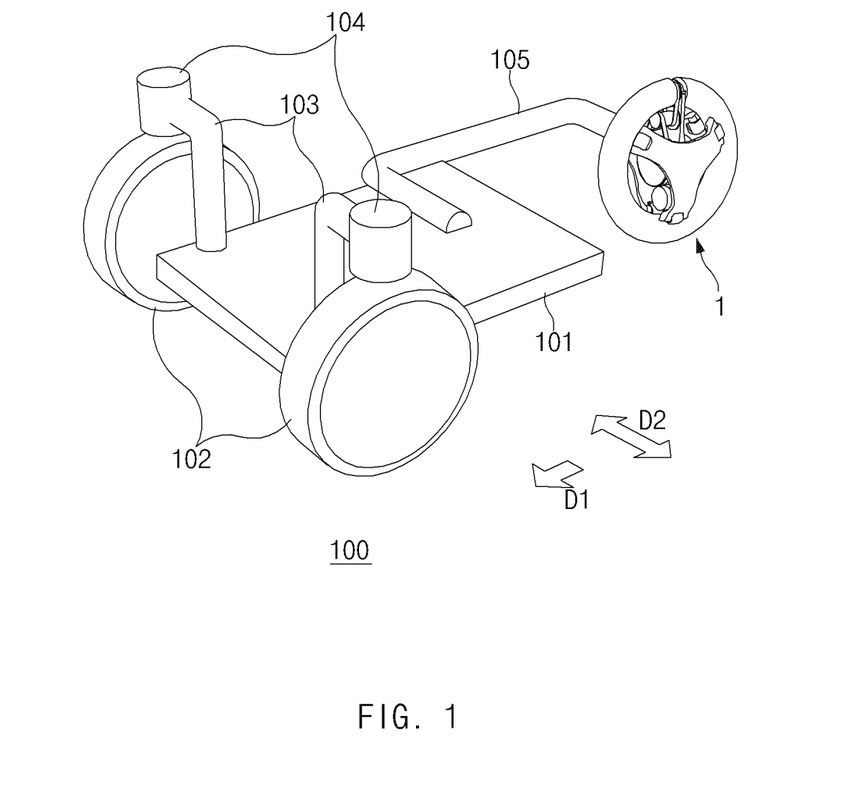
FIG. 1 is a conceptual diagram of a three-wheeled vehicle according to an exemplary embodiment of the present disclosure.
Figure 2:
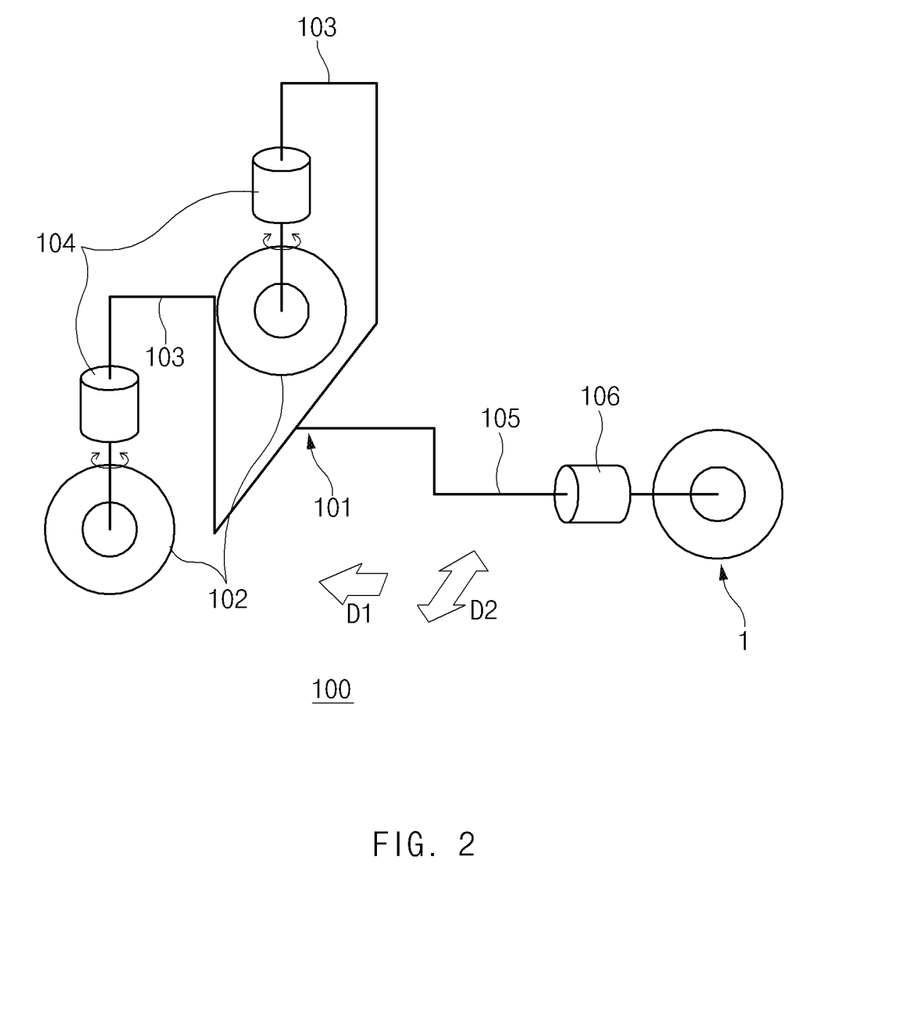
FIG. 2 is another conceptual diagram of a three-wheeled vehicle according to an exemplary embodiment of the present disclosure.

FIG. 1 is a conceptual diagram of a three-wheeled vehicle 100 according to an exemplary embodiment of the present disclosure. FIG. 2 is another conceptual diagram of a three-wheeled vehicle 100 according to an exemplary embodiment of the present disclosure.

Referring to the drawings, a three-wheeled vehicle 100 according to an exemplary embodiment of the present disclosure may include a vehicle body 101, an omnidirectional wheel 1, and front wheels 102. The vehicle body is a component for carrying an object or an occupant seated therein. Although the vehicle body 101 is illustrated in the conceptual diagrams of an exemplary embodiment of the present disclosure as being formed in a plate shape such that an object or an occupant is easily seated therein, it may further include a configuration for preventing an object or an occupant from being thrown therefrom, or may be formed in any of various other structures to allow an object or an occupant to be easily seated therein.

The front wheels 102 may be mounted at the front portion of the vehicle body 101. In particular, two front wheels 102 may be mounted at the front portion of the vehicle body 101 in a main travel direction D1. These front wheels 102 may be rotatably connected to the vehicle body 101 to move the vehicle body 101 in the main travel direction D1. The front wheels 102 may be connected to the vehicle body 101 via front wheel connection parts 103. Each of the front wheels 102 may be configured to generate driving force using an in-wheel driving unit (not shown), which is disposed therein, and may rotate about a main rotation axis A1 parallel to a sub-travel direction D2 to thus drive the vehicle.

The in-wheel driving unit may be a motor, but the present disclosure is not limited thereto. The front wheels 102 may rotate about the main rotational axis A1 to move the vehicle body 101 in the main travel direction D1. In addition, the front wheels 102 may be configured to also rotate about an axis parallel to the vertical direction, to thus change the main travel direction D1 and the sub-travel direction D2, in which the vehicle body 101 moves. When the front wheels 102 rotate about the axis parallel to the vertical direction, the angles that the front wheels 102 form relative to the vehicle body 101 may change, thereby changing the main travel direction D1 and the sub-travel direction D2. When the front wheels 102 rotate about the main rotation axis A1 parallel to the new sub-travel direction D2, the vehicle body 101 may move in the new main travel direction D1.

A steering device (not shown) may be further connected to the vehicle body 101 to rotate the front wheels 102 about the axis parallel to the vertical direction. The steering device may be connected to front wheel steering parts 104 of the front wheels 102 via the front wheel connection parts 103 to operate the front wheel steering parts 104 when the steering device is manipulated by a user. The steering device may be implemented as a steering wheel, which is configured to be grasped and rotated by the user, but the present disclosure is not limited thereto. The front wheels 102 may be rotated about the axis parallel to the vertical direction by the operation of the front wheel steering parts 104, and the direction in which the front wheels are oriented may thus be changed, thereby steering the vehicle. The front wheel steering parts 104 may be a motor, but the present disclosure is not limited thereto.

The omnidirectional wheel 1 may be connected to the vehicle body 101 to move the vehicle body 101 in the main travel direction D1 or in the sub-travel direction D2 perpendicular to the main travel direction D1. The omnidirectional wheel 1 may be connected to the vehicle body 101 via a wheel connection part 105 at the rear side of the vehicle body 101. A wheel-driving unit 106 for driving a main rotation unit 20 of the omnidirectional wheel 1 may be disposed in the wheel connection part 105. The wheel-driving unit 106 may be configured to generate driving force, and provide the driving force to the omnidirectional wheel 1 to cause the omnidirectional wheel 1 to rotate about the main rotation axis A1. The wheel-driving unit 106 may be a motor, but the present disclosure is not limited thereto.

Figure 3:
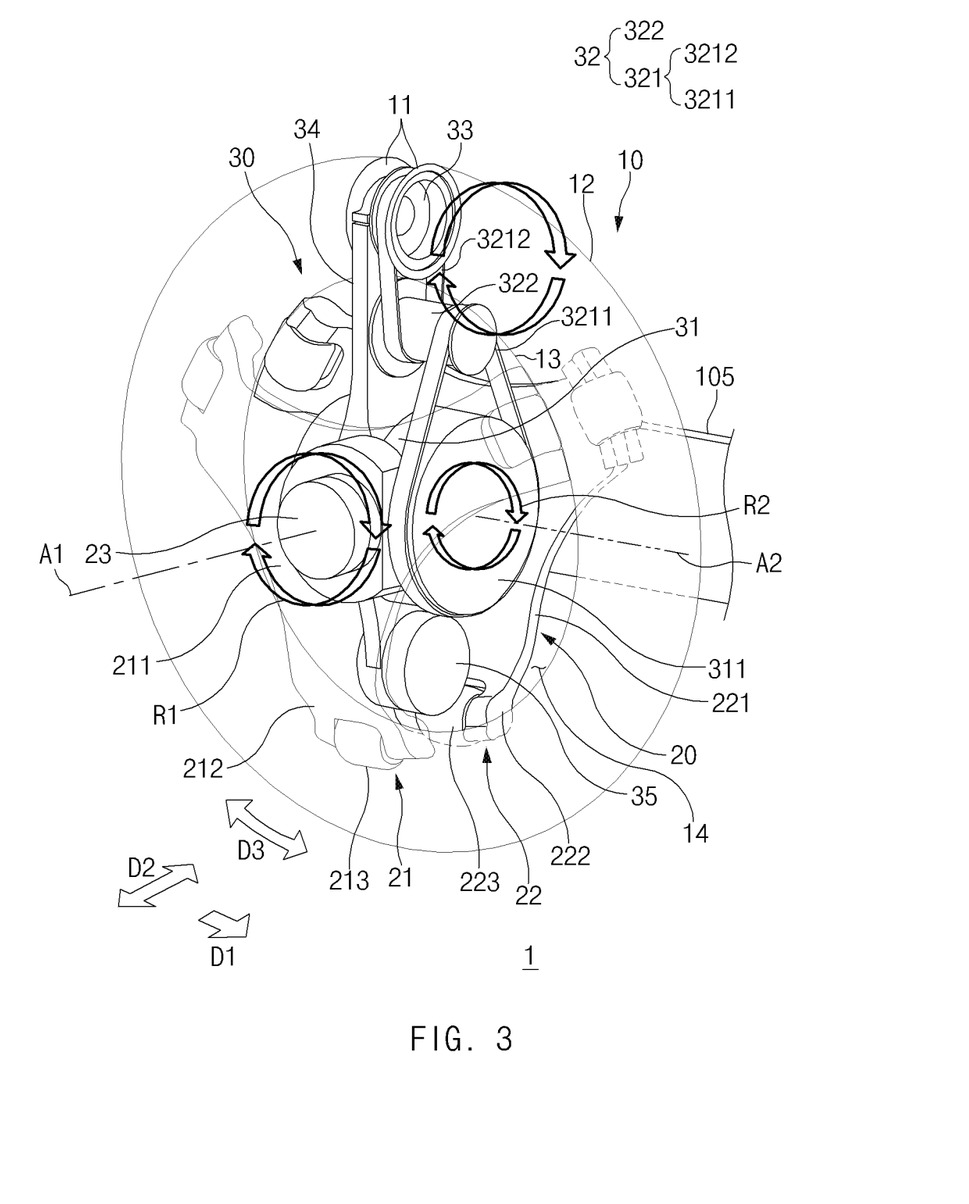
FIG. 3 is a view illustrating the structure of an omnidirectional wheel used in a three-wheeled vehicle according to an exemplary embodiment of the present disclosure.

FIG. 3 is a view illustrating the structure of the omnidirectional wheel 1 used in the three-wheeled vehicle 100 according to an exemplary embodiment of the present disclosure. Referring to the drawing, the omnidirectional wheel 1 according to an exemplary embodiment of the present disclosure may include a tire 10, a main rotation unit 20, and a circumferential rotation unit 30. With this structure, the omnidirectional wheel 1 is capable of traveling in the main travel direction D1 and the sub-travel direction D2.

Tire 10

The tire 10 is a component of the omnidirectional wheel 1, and may be formed in the shape of an open torus having an open portion. Particularly, the open torus shape is a shape in which the torus has an open portion that is open at a specific point in the circumferential direction D3 thereof. In other words, the shape of the tire 10, which is observed when cutting the same along the plane perpendicular to the sub-travel direction D2, is an open shape.

The tire 10 may form the outermost edge of the omnidirectional wheel 1 when the omnidirectional wheel 1 is observed from the plane perpendicular to the sub-travel direction D2. Thus, when the omnidirectional wheel 1 rotates, the tire 10 rotates along therewith while contacting the ground to cause the vehicle body 101 to travel in the main travel direction D1.

The tire 10 may be configured to rotate about the main rotation axis A1 and also about a circumferential axis formed in the circumferential direction D3 thereof. When the tire 10 rotates about the circumferential axis formed in the circumferential direction D3, a first portion 12 thereof, which is disposed at the outer side in the radial direction thereof, may move to the inner side in the radial direction thereof, and a second portion 13 thereof, which is disposed at the inner side in the radial direction thereof, may move to the outer side in the radial direction thereof. Due to the rotation of the tire 10, the omnidirectional wheel 1 may be configured to move in the sub-travel direction D2. The rotation of the tire 10 about the circumferential axis may be performed by the circumferential rotation unit 30, which will be described later.

To perform the above-described operation, the tire 10 may be formed of an elastic material such as rubber. Since the inner diameter and the outer diameter of the tire 10 are different from each other, the respective portions of the tire 10 are compressed and expanded when the tire 10 rotates about the circumferential axis and thus, the elastic material is beneficial.

Figure 4:
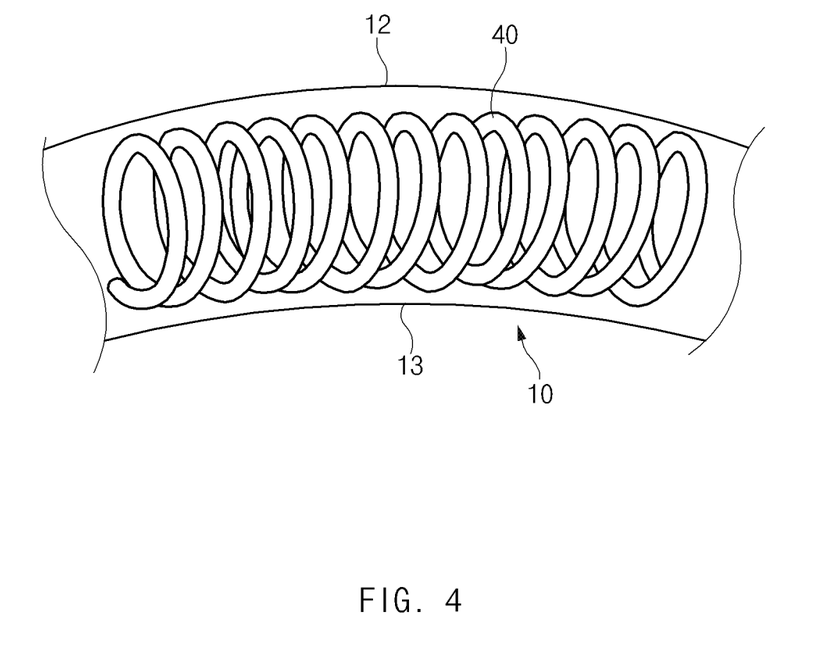
FIG. 4 is a view illustrating a coil spring disposed in an omnidirectional wheel according to an exemplary embodiment of the present disclosure.

FIG. 4 is a view illustrating a coil spring 40 disposed in the omnidirectional wheel 1 according to an exemplary embodiment of the present disclosure. Referring further to FIG. 4, the omnidirectional wheel 1 may further include a coil spring 40 disposed within the tire 10. The coil spring 40 may be formed in the shape of a torus that is open along the profile of the tire 10, and may be disposed within the tire 10. Thus, the coil spring 40 may enhance the rigidity of the tire 10 to allow the tire 10 to maintain the open torus shape.

Main Rotation Unit 20

The main rotation unit 20 may be configured to rotate the tire 10 about the main rotation axis A1. The main rotation unit 20 may be connected to the tire 10, and may be configured to rotate the tire 10 about the main rotation axis A1, which passes through the center of an inner opening 14, which is a circular hole defined by the tire 10. The direction in which the main rotation unit 20 rotates about the main rotation axis A1 is indicated by the arrows denoted by R1 in FIG. 3.

The main rotation unit 20 may include main rotation members 21 and 22 and a main shaft member 23. The main shaft member 23 may be configured to receive driving force from the wheel-driving unit, and transmit the driving force to the main rotation members 21 and 22, which are connected to the tire 10 to thus rotate the tire 10 about the main rotation axis A1. The main shaft member 23 may be rotated by receiving the driving force from the wheel-driving unit 106 via a mechanical element, such as a sprocket or a belt.

The main shaft member 23 may extend in the sub-travel direction D2, and rotate about the main rotation axis A1. The main shaft member 23 may be directly or indirectly connected to the wheel-driving unit 106 to receive the driving force generated by the wheel-driving unit 106, and may rotate about the main rotation axis A1. The main shaft member 23 may be rotatably coupled to the wheel connection part 105.

Two main rotation members 21 and 22 may respectively cover opposite sides of the inner opening 14, and may be in contact with the tire 10 such that the tire 10 is sandwiched and supported therebetween (e.g., tire is disposed between two main rotation members). Thus, when the tire 10 is fixedly disposed between the two main rotation members 21 and 22, the driving force transmitted to the main shaft member 23 causes the main rotation members 21 and 22 to rotate about the main rotation axis A1, along which the tire 10 also rotates about the main rotation axis A1. FIG. 3 illustrates that the first main rotation member 21 may be disposed on the side of the tire 10 that is oriented in the direction protruding from the plane of the drawing and that the second main rotation member 22 may be disposed on the side of the tire 10 that is oriented in the direction recessed into the plane of the drawing.

The main rotation members 21 and 22 may be connected to the main shaft member 23, and may be configured to rotate together with rotation of the main shaft member 23. The main shaft member 23 may penetrate a circumferential driving part 31 of the circumferential rotation unit 30 to be described later, or may be disposed on each of opposite sides of the circumferential driving part 31, thereby connecting the two main rotation members 21 and 22 to each other via the circumferential driving part 31. In other words, the two main rotation members 21 and 22 may be connected to each other via the circumferential rotation unit 30 to rotate in conjunction with each other.

The main rotation members 21 and 22 may have a shape that protrudes in the outward direction from the inner opening 14. Specifically, the main rotation members 21 and 22 may include neighboring portions 212 and 222, formed at the edge portion thereof to be adjacent to the tire 10, and a space formed in the center portion thereof to accommodate the circumferential rotation unit 30 therein.

Described in detail, the main rotation members 21 and 22 may include main rotation plates 211 and 221 and rolling members 213 and 223. The main rotation plates 211 and 221 may have neighboring portions 212 and 222, which are adjacent to the outer side surface of the tire 10, and may be connected to the circumferential rotation unit 30. The main rotation plates 211 and 221 may be formed in the shape of a triangle, all sides of which are recessed inwards and thus, three neighboring portions 212 and 222 may be formed at the vertices while being spaced apart from each other at regular angular intervals. The main rotation plates 211 and 221 may be formed in a rectangular shape. However, the present disclosure is not limited as to the specific shape of the main rotation plates 211 and 221.

The rolling members 213 and 223 may be rotatably connected to the neighboring portions 212 and 222 to support rotation of the tire 10 about the circumferential axis. The rolling members 213 and 223 may be in contact with the surface of the tire 10 to support the rotation of the tire 10 and also to press the tire 10 to cause the tire 10 to rotate in conjunction with rotation of the main rotation members 21 and 22 about the main rotation axis A1. The rolling members 213 and 223 may be implemented as a mechanical element such as a roller or a caster, but the present disclosure is not limited thereto.

The rolling members 213 and 223 may be coupled to the neighboring portions 212 and 222 to be rotatable about the circumferential axis. When the main rotation plates 211 and 221 are formed in a triangular shape, as described above, three vertices are formed, and thus three rolling members 213 and 223 are provided.

Circumferential Rotation Unit 30

The circumferential rotation unit 30 may be configured to rotate the tire 10 about the circumferential axis in an in-wheel manner. While rotating together with the tire 10 about the main rotation axis A1 due to the operation of the main rotation unit 20, the circumferential rotation unit 30 may be configured to provide driving force for rotating the tire 10 about the circumferential axis. One of the directions in which the components of the circumferential rotation unit 30 rotate such that the tire 10 rotates about the circumferential axis formed in the circumferential direction D3 is indicated by the arrows denoted by R2 in FIG. 3, and the rotation axis of the circumferential driving part 31 is indicated by the alternate long and two short dashes line denoted by A2 in FIG. 3.

The circumferential rotation unit 30 may connect two opposite ends 11 of the tire 10, which define the open portion of the tire 10, to each other, and may be configured to rotate the tire 10 about the circumferential axis of the tire 10 to move the tire 10 in the sub-travel direction D2. Specifically, the circumferential rotation unit 30 may include a circumferential connection member 33, a circumferential driving part 31, and a power transmission part 32.

The circumferential connection member 33 may be disposed in the open portion of the tire 10, and may connect the two opposite ends 10 of the tire 10 to each other. Thus, when viewed in the sub-travel direction D2, the tire 10 and the circumferential connection member 33 may form a completely annular shape. The circumferential connection member 33 may be formed in a cylindrical shape. The circumferential connection member 33 may extend in the tangential direction of the tire 10 in the open portion formed in the circumferential direction D3 of the tire 10.

When the circumferential connection member 33 rotates about an axis formed in the direction of extension thereof, the tire 10 may also rotate about the circumferential axis together therewith. Additionally, the circumferential driving part 31 may be disposed in the inner opening 14 and may be configured to generate driving force. The circumferential driving part 31 may include a motor configured to generate driving force, but the present disclosure is not limited thereto.

The power transmission part 32 may be configured to transmit the driving force generated by the circumferential driving part 31 to the circumferential connection member 33 to rotate the circumferential connection member 33 about the circumferential axis. Accordingly, the power transmission part 32 may include a driving belt 321, and may further include a belt connection shaft 322.

The driving belt 321 may be formed in the shape of a belt that is rotatable to transmit driving force from the circumferential driving part 31 to the circumferential connection member 33. To transmit the driving force, the driving belt 321 may include a first driving belt 3211 connected to an output member 311 of the circumferential driving part 31 and a second driving belt 3212 connected to the circumferential connection member 33. The first driving belt 3211 and the second driving belt 3212 may be connected to each other via the belt connection shaft 322, thereby transmitting the driving force generated by the circumferential driving part 31 to the circumferential connection member 33.

The belt connection shaft 322 may be connected to the first driving belt 3211 and the second driving belt 3212 to receive driving force from the first driving belt 3211 and transmit the driving force to the second driving belt 3212. Thus, the belt connection shaft 322 may be disposed between the circumferential connection member 33 and the circumferential driving part 31 to be parallel to the circumferential connection member 33, and may be configured to rotate in the direction in which the circumferential connection member 33 rotates. The driving belt 321, which connects these components to each other, may also be configured to rotate in the direction in which the circumferential connection member 33 rotates.

The belt connection shaft 322 may be formed in a cylindrical shape, the diameter of which is less than the diameter of the output member 311 of the circumferential driving part 31, which is connected to the first driving belt 3211 to rotate the first driving belt 3211. Further, the diameter of each of two opposite ends of the belt connection shaft 322 may be greater than the diameter of the center portion of the belt connection shaft 322. Accordingly, the two opposite ends of the belt connection shaft 322 may serve as projections to prevent the driving belt 321 connected to the center portion of the belt connection shaft 322 from being separated from the belt connection shaft 322.

Meanwhile, the power transmission part 32 may include only one driving belt 321 without the belt connection shaft 322 to directly connect the circumferential driving part 31 to the circumferential connection member 33. Of course, the power transmission part 32 may be formed in any of various other configurations.

The circumferential rotation unit 30 may further include a circumferential arm 34, which extends from the circumferential driving part 31 to the circumferential connection member 33 and to which the circumferential connection member 33 is rotatably connected. Based on the radial direction of the tire 10, the inner end of the circumferential arm 34 may be connected to the circumferential driving part 31, and the outer end of the circumferential arm 34 may have an opening into which the circumferential connection member 33 is inserted to be rotatably connected to the circumferential arm 34. Accordingly, since the circumferential connection member 33 and the circumferential driving part 31 are connected to each other via the circumferential arm 34, the positions of the components of the circumferential rotation unit 30 relative to each other may be fixed.

The circumferential rotation unit 30 may further include a circumferential counterweight 35. The circumferential counterweight 35 may extend from the circumferential driving part 31 in a direction opposite the direction in which the circumferential arm 34 extends. The circumferential counterweight 35 may extend to a position at which contact with the tire 10 is avoided. The circumferential counterweight 35 may eliminate weight imbalance in the omnidirectional wheel 1, which may occur due to the arrangement of the power transmission part 32 and the circumferential arm 34. To avoid interfering with the rotation of the tire 10, the circumferential counterweight 35 may be formed to avoid contact with the tire 10, as illustrated in the drawings.

The circumferential driving part 31 and the power transmission part 32 of the circumferential rotation unit 30 may be disposed in the inner opening 14. Further, the circumferential driving part 31 and the power transmission part 32 of the circumferential rotation unit 30 may be disposed between the two main rotation members 21 and 22, and thus may be protected from external factors.

The three-wheeled vehicle 100 according to the present disclosure, which includes the vehicle body 101, the front wheels 102, and the above-structured omnidirectional wheel 1 capable of traveling in two directions perpendicular to each other, may turn with a turning radius equal to or less than the turning radius of a general three-wheeled vehicle. Therefore, the three-wheeled vehicle 100 according to the present disclosure is capable of freely moving in a narrow alley, a crowded area in which the travel direction thereof needs to be changed frequently, etc.

As is apparent from the above description, the present disclosure provides an omnidirectional wheel capable of reducing the turning radius of a vehicle. In addition, a three-wheeled vehicle equipped with the above omnidirectional wheel is capable of freely moving in a narrow alley, a crowded area in which the travel direction thereof needs to be changed frequently, etc.

Although it has been described above that all of the components of an exemplary embodiment of the present disclosure are coupled as a single unit or coupled and operated as a single unit, the present disclosure is not limited to such an exemplary embodiment. In other words, within the purpose of the present disclosure, all of the components may be selectively coupled and operated as one or more units.

While some exemplary embodiments of the present disclosure have been described with reference to the accompanying drawings, those skilled in the art may change and modify the present disclosure in various ways without departing from the essential characteristics of the present disclosure. Accordingly, the disclosed embodiments should not be construed to limit the technical spirit of the present disclosure, but should be construed to illustrate the technical spirit of the present disclosure. The scope of the present disclosure is not limited by the embodiments, and the scope of the present disclosure should be interpreted based on the following appended claims. Accordingly, the present disclosure should be construed to cover all modifications or variations inducible from the meaning and scope of the appended claims and equivalents thereof.

What is claimed is:

1. An omnidirectional wheel, comprising:
   a tire formed in a shape of an open torus including an open portion at a specific point in a circumferential direction defined by two opposite ends of the tire;
   a main rotation unit connected to the tire to rotate the tire about a main rotation axis passing through a center of an inner opening formed in a circular hole shape by the tire; and
   a circumferential rotation unit that connects the opposite ends of the tire that form the open portion therebetween, wherein the circumferential rotation unit is configured to rotate the tire about a circumferential axis formed in a circumferential direction of the tire to move the tire in a direction parallel to the main rotation axis;
   wherein the circumferential rotation unit includes:
      a circumferential connection member disposed in the open portion to connect the opposite ends of the tire to each other;
      a circumferential driving part disposed in the inner opening, the circumferential driving part being configured to generate driving force; and
      a power transmission part configured to transmit driving force generated by the circumferential driving part to the circumferential connection member to cause the circumferential connection member to rotate about the circumferential axis of the tire.

2. The omnidirectional wheel according to claim 1, wherein the power transmission part includes a driving belt formed in a shape of a belt that is rotatable, the driving belt being configured to transmit driving force from the circumferential driving part to the circumferential connection member.

3. An omnidirectional wheel, comprising:
   a tire formed in a shape of an open torus including an open portion,
   a main rotation unit connected to the tire to rotate the tire about a main rotation axis passing through a center of an inner opening formed in a circular hole shape by the tire,; and
   a circumferential rotation unit that connects opposite ends of the tire that form the open portion therebetween, wherein the circumferential rotation unit is configured to rotate the tire about a circumferential axis formed in a circumferential direction of the tire to move the tire in a direction parallel to the main rotation axis;
   wherein the circumferential rotation unit includes:
      a circumferential connection member configured to connect the opposite ends of the tire to each other;
      a circumferential driving part disposed in the inner opening, the circumferential driving part being configured to generate driving force; and
      a power transmission part configured to transmit driving force generated by the circumferential driving part to the circumferential connection member to cause the circumferential connection member to rotate about the circumferential axis of the tire;
      wherein the power transmission part includes a driving belt formed in a shape of a belt that is rotatable, the driving belt being configured to transmit driving force from the circumferential driving part to the circumferential connection member;
   wherein the driving belt includes a first driving belt connected to the circumferential driving part and a second driving belt connected to the circumferential connection member, and
   wherein the power transmission part includes a belt connection shaft connected to the first driving belt and the second driving belt, wherein the belt connection shaft is configured to receive driving force from the first driving belt and to transmit the driving force to the second driving belt.

4. The omnidirectional wheel according to claim 3, wherein the belt connection shaft has a diameter less than a diameter of an output member of the circumferential driving part that is connected to the first driving belt to rotate the first driving belt.

5. The omnidirectional wheel according to claim 2, wherein the driving belt rotates about an axis passing through a center of the circumferential connection member, the axis being parallel to a direction in which the circumferential connection member extends.

6. The omnidirectional wheel according to claim 1, wherein the circumferential rotation unit includes:
   a circumferential arm that extends from the circumferential driving part toward the circumferential connection member,
   wherein the circumferential arm allows the circumferential connection member to be rotatably connected thereto.

7. An omnidirectional wheel, comprising:
   a tire formed in a shape of an open torus including an open portion;
   a main rotation unit connected to the tire to rotate the tire about a main rotation axis passing through a center of an inner opening formed in a circular hole shaped by the tire; and
   a circumferential rotation unit that connects opposite ends of the tire that form the open portion therebetween, wherein the circumferential rotation unit is configured to rotate the tire about a circumferential axis formed in a circumferential direction of the tire to move the tire in a direction parallel to the main rotation axis,
   wherein the circumferential rotation unit includes:
      a circumferential connection member configured to connect the opposite ends of the tire to each other;
      a circumferential driving part disposed in the inner opening, the circumferential driving part being configured to generate driving force;
      a power transmission part configured to transmit driving force generated by the circumferential driving part to the circumferential connection member to cause the circumferential connection member to rotate about the circumferential axis of the tire;
      a circumferential arm that extends from the circumferential driving part toward the circumferential connection member; and
      a circumferential counterweight that extends from the circumferential driving part in a direction opposite to a direction in which the circumferential arm extends,
   wherein the circumferential counterweight is mounted to avoid contact with the tire, and
   wherein the circumferential arm allows the circumferential connection member to be rotatably connected thereto.

8. The omnidirectional wheel according to claim 1, wherein the main rotation unit includes:
- a main shaft member that extends in a sub-travel direction parallel to the main rotation axis, the main shaft member being configured to rotate about the main rotation axis; and
- two main rotation members configured to be in contact with the tire while respectively covering opposite sides of the inner opening in the sub-travel direction to dispose the tire therebetween,
- wherein the two main rotation members are connected to the main shaft member to rotate about the main rotation axis in conjunction with rotation of the main shaft member.

9. The omnidirectional wheel according to claim 8, wherein the circumferential rotation unit is connected to the main shaft member to connect the two main rotation members to the main shaft member therethrough.

10. The omnidirectional wheel according to claim 9, wherein each of the main rotation members includes:
- a main rotation plate having neighboring portions formed to be adjacent to an outer side surface of the tire, the main rotation plate being connected to the circumferential rotation unit; and
- rolling members rotatably connected to the neighboring portions to support rotation of the tire about the circumferential axis.

11. The omnidirectional wheel according to claim 10, wherein the main rotation plate has a shape of a triangle formed with all sides thereof are recessed inwards, and wherein the neighboring portions are respectively formed at three vertices of the main rotation plate while being spaced apart from each other at regular angular intervals.

12. The omnidirectional wheel according to claim 1, further comprising:
- a coil spring disposed in the tire to enhance rigidity of the tire.

13. The omnidirectional wheel according to claim 1, wherein the tire is formed of an elastic material.

14. A three-wheeled vehicle, comprising:
- a vehicle body;
- an omnidirectional wheel connected to the vehicle body to move the vehicle body in a main travel direction or in a sub-travel direction perpendicular to the main travel direction; and
- two front wheels connected to the vehicle body, the front wheels being configured to change the main travel direction in which the vehicle body moves through rotation thereof about an axis parallel to a vertical direction and to move the vehicle body in a new main travel direction through rotation thereof about a main rotation axis parallel to a sub-travel direction changed along with a change in the main travel direction,
- wherein the omnidirectional wheel includes:
  - a tire formed in an open torus shape including an open portion at a specific point in a circumferential direction defined by two opposite ends of the tire;
  - a main rotation unit configured to rotate the tire about the main rotation axis; and
  - a circumferential rotation unit configured to rotate the tire about a circumferential axis formed in the circumferential direction of the tire to move the tire in the sub-travel direction;
- wherein the circumferential rotation unit includes:
  - a circumferential connection member disposed in the open portion to connect the opposite ends of the tire to each other;
  - a circumferential driving part disposed in the inner opening, the circumferential driving part being configured to generate driving force; and
  - a power transmission part configured to transmit driving force generated by the circumferential driving part to the circumferential connection member to cause the circumferential connection member to rotate about the circumferential axis of the tire.

* * * * *